Dec. 2, 1941.          G. W. TIDD          2,264,944
BLADE MOUNTING FOR AIRCRAFT SUSTAINING ROTORS
Filed Oct. 16, 1940

INVENTOR
Gage W. Tidd
BY
Synnestvedt & Lechner
ATTORNEYS

Patented Dec. 2, 1941

2,264,944

UNITED STATES PATENT OFFICE 2,264,944

BLADE MOUNTING FOR AIRCRAFT SUSTAINING ROTORS

Gage W. Tidd, Willow Grove, Pa., assignor to Autogiro Company of America, Willow Grove, Pa., a corporation of Delaware Application October 16, 1940, Serial No. 361,420

8 Claims. (Cl. 244—18)

This invention relates to an improved blade mounting for aircraft sustaining rotors and especially to a mounting fork adapted to cooperate with a blade pivot. Moreover, the invention is particularly concerned with a mounting fork cooperating with a drag pivot for the blade.

Although not limited in its application, the invention is especially useful in that type of craft in which the motor may be coupled to drive the rotor, at least under certain conditions.

An example of such an aircraft is described in copending applications of Agnew E. Garsen Serial No. 271,841, filed May 5, 1939, and Serial No. 359,677, filed October 4, 1940, assigned to the assignee of the present applications. In accordance with said copending application, the rotor is driven while the machine is on the ground with the blades at zero pitch, the motor thereafter being uncoupled and the blade pitch angle raised to effect jump, or vertical take-off.

During various phases of operation of the type above referred to, the drag pivot forks are, at times, deformed because of the heavy loads resulting from blade movements. Such deformation is especially troublesome where the drag pivot has its axis acutely angled with respect to a plane perpendicular to the hub axis (as disclosed, for example, in said copending applications) due to the fact that with an acute pivot the forks carry a heavy "droop" load when the blade is hanging at rest.

It is a primary object of my invention to provide a drag pivot fork which is highly resistant to deformations resulting from conditions above mentioned.

Another object of my invention lies in the provision of a drag pivot fork having strengthening means which add a considerable degree of rigidity to the fork and are so disposed as to serve also as limiting means for lag-lead movements of the blade. These means are further arranged to permit ready folding of the blades.

The manner in which the blade mounting fork of the present invention achieves the foregoing and other advantageous results, will be best understood by consideration of the accompanying drawing in which is illustrated the preferred embodiment of my invention.

Figure 1:
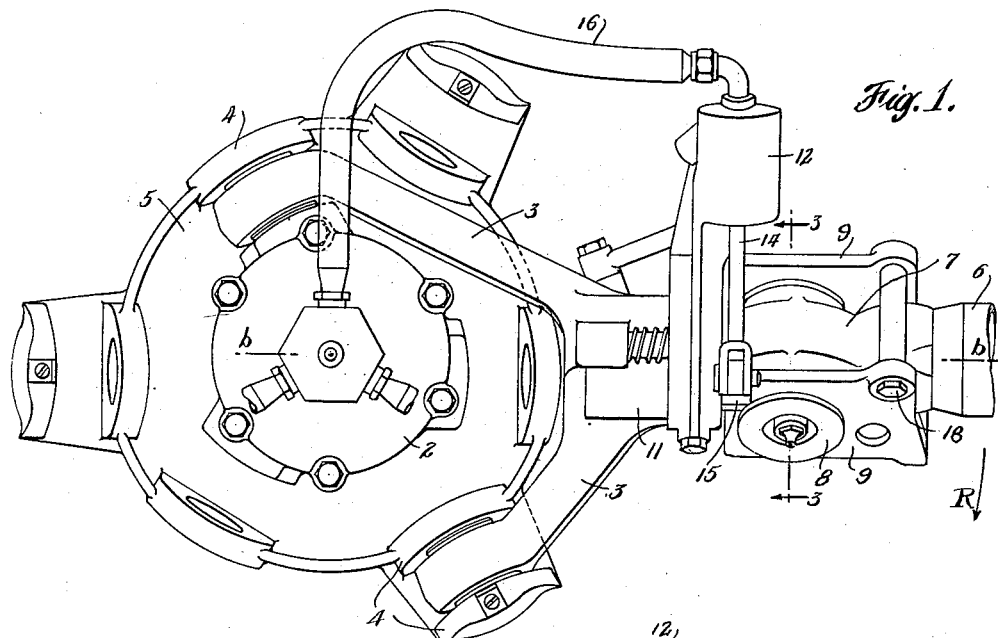
Figure 1 is a plan view of a rotor hub showing the attachment of one of the blades, with my invention applied thereto.

Referring more particularly to Figure 1, the rotative hub is indicated by the reference numeral 2, and the blade is connected with this hub by means of three pivots, i. e. a "flapping" pivot, a "drag" pivot, and a pitch change pivot.

The prongs 3—3 of the flapping pivot fork embrace the hub 2, being mounted on flapping pivot pins (not shown) which are journalled in apertured lugs 4—4, carried by flange structure 5 projecting from the hub 2.

The root end 6 of each blade is provided with an apertured block 7 through which the drag pivot pin 8 extends, the pin in turn being mounted in the prongs 9—9 of the drag pivot fork.

For pitch change, the drag fork has secured to its base end a threaded sleeve 10 (see Figure 2) which cooperates with threads formed on the interior of housing 11 (Figure 1), the sleeve having its axis coincident with that of the fork and blade. For effecting such pitch change, there is provided a fluid pressure cylinder 12, with a piston 13 therein. This piston reacts through link 14, and arm 15 formed with the base of the drag fork, to turn the fork and thereby the blade root end 6, about the blade axis b—b. The cylinder itself is connected with a suitable source of fluid under pressure by means of the supply pipe 16. Introduction of fluid into the cylinder 12 effects reduction of blade pitch. Blade pitch increase is effected upon release of pressure, as the sense of threading of the sleeve is so chosen that in the absence of some restraining force, such as the pressure utilized in the cylinder, centrifugal force acting on the blade causes it to rotate about the axis of said sleeve in a direction to increase the blade pitch, this general type of operation being described more fully in the copending applications above referred to.

Figure 3:
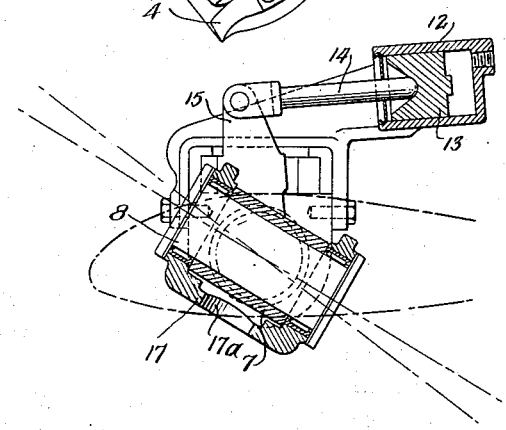
Figure 3 is a sectional view of the fork and certain associated parts, taken as indicated by the section line 3—3 of Figure 1.
Figure 2:
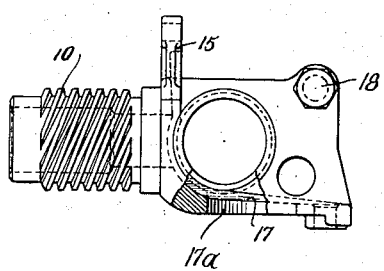
Figure 2 is a plan view of the drag link itself, on a larger scale, showing the threaded sleeve utilized for blade pitch change.

Turning to Figures 2 and 3, we find that the fork has two prong interbracing means, i. e. a web 17 joining two side prong margins, and a bolt 18 connecting margins opposite thereto. With regard to the web, it should be noted that as appears in Figure 2, this web extends from the open end of the fork back along opposed prong margins and connects with the base of the fork, thereby lending considerable rigidity to the device. If desired, the web may be apertured as indicated at 17a.

As clearly appears in Figure 3, the web interconnects the fork prongs along the lower margins thereof, said lower margins also being (by reason of the angularity of the fork—discussed later in the specification) located at the leading side of said fork with respect to the direction of rotation of the rotor. Thus this strengthening web is positioned to serve as a stop for leading movements of the blade, for when the blade swings about the axis of the pivot in a leading direction it will abut against the edge of said web. Furthermore, by reason of the fork angularity, this same outer edge of the web constitutes a blade droop support when the rotor is at rest.

Similarly, the bolt 18 serves as a limiting stop for lagging movements about the drag pivot axis, and is readily removable to permit substantial angular swinging of the blade about the axis of pivot 8, and thereby blade folding. The manner of this folding need not be set forth in detail here as it forms no part of the present invention per se, and is described and claimed in assignee's copending application Serial No. 238,729, filed November 4, 1938, now Patent No. 2,220,109, issued November 5, 1940.

In considering the operation of the mechanism herein disclosed, attention is first called to the fact that the angling of the drag pivot is such as to introduce a flapping component into the normal lag-lead blade movements. This results in aerodynamic damping of such lag-lead movements, since a lag or lead movement of a certain magnitude will be accompanied by a given flapping movement. In the preferred form as illustrated, this flapping movement is in the upward direction upon lagging of the blade, this, in turn, introducing a centrifugal restoring moment which tends to bring the blade back to its normal path of rotation. (The direction of rotation is indicated by the arrow R in Figure 1.) This action takes place both in the air and while the rotor is being driven on the ground with the blades at zero pitch. When the blades are adjusted to this zero setting, the drag pivot is angularly shifted and its axis then makes a smaller angle with a plane perpendicular to the hub axis, and the flapping component of lag-lead movements is correspondingly increased. Thus, even though application of either torque or braking force to the hub causes a strong tendency to lag or lead, the increase of the flapping component increases the centrifugal restoring moment and the blade is maintained close to a truly radial position.

Operations such as those outlined above subject the drag fork to torsional and other deforming stresses of considerable magnitude. Moreover, since the strengthening pin and web constitute lag and lead stops respectively, additional deforming stresses arise, especially in machines capable of jump take-off, because of the heavy lag force resulting when driving torque is initially applied.

Still another source of deforming force arises from the fact that the web constitutes a blade droop support, and bouncing of the blade while taxiing can make this force a very considerable factor.

The arrangement herein disclosed comprises a fork which is strengthened to effectively eliminate deformation arising from the forces outlined just above, and, in addition, utilizes the strengthening means as lag-lead and droop stops, thereby considerably simplifying the rotor blade mounting. Moreover, although such means provide a high degree of rigidity in the drag fork member, the invention still realizes relatively simple folding of the rotor blades. In addition to the above advantages, this device incorporates in the same fork member, part of the pitch change mounting, thereby further contributing to simplicity of the hub system.

I claim:

1. A blade mounting member for rotary-winged aircraft comprising: a drag pivot fork having attachment means rigidly secured to its base end and a strengthening web interconnecting the fork prongs at opposite sides of the fork along prong margins substantially parallel to the major axis of said fork, limit means interconnecting said prongs in a marginal region opposite to the zone of web interconnection, said means and said web being spaced from each other to accommodate normal blade swinging movements about said pivot, said limit means being displaceable to provide for substantial angular swinging of said blade about said pivot; and said web being positioned to serve as a stop for blade leading movements substantially in the plane of rotation.

2. In an aircraft sustaining rotor having a hub and a blade, a blade mounting including inboard and outboard parts connecting the blade with the hub, wherein: said outboard part comprises a drag pivot fork having a sleeve rigidly secured to its base end and extended generally lengthwise of the blade, said sleeve being in cooperating threaded relation with said inboard part whereby rotation of said sleeve on its cooperating thread provides blade pitch change, and wherein a web is provided interconnecting the fork prongs along prong margins substantially parallel to the major axis of the blade.

3. A construction according to claim 1 wherein said pivot fork prongs are further interconnected by a member on margins opposite to those of web interconnection, said member being readily displaceable to permit substantial angular movement of said blade upon said pivot and thereby folding of the blade.

4. A blade mounting member for rotary-winged aircraft comprising: a drag pivot fork having a strengthening web interconnecting the fork prongs at opposite sides of the fork along prong margins substantially parallel to the major axis of said fork, means interconnecting said prongs in a marginal region opposite to the zone of web interconnection, said means and said web being spaced from each other to accommodate normal blade swinging movements about said pivot, and said means being displaceable to provide for substantial angular swinging of said blade about said pivot.

5. A blade mounting member for rotary-winged aircraft comprising: a drag pivot fork having attachment means rigidly secured to its base end and a strengthening web interconnecting the fork prongs at opposite sides of the fork along prong margins substantially parallel to the major axis of said fork, means interconnecting said prongs in a marginal region opposite to the zone of web interconnection, said means and said web being spaced from each other to accommodate normal blade swinging movements about said pivot, said means normally serving to limit angular movement of the blade on the pivot but being displaceable to provide for substantial angular swinging of said blade about said pivot.

6. A blade mounting member for rotary-winged aircraft comprising: a drag pivot fork having attachment means rigidly secured to its base end and strengthening members interconnecting the fork prongs at opposite sides of the fork along opposed prong margins substantially parallel to the major axis of said fork, said members constituting blade movement limit means, and being spaced from each other to accommodate normal blade swinging movements about said pivot, one of said members being displaceable to provide for substantial angular swinging of said blade about said pivot.

7. In an aircraft sustaining rotor having a hub and a blade, a blade mounting including two cooperating parts connecting the blade with the hub, wherein: one of said parts comprises a drag pivot fork having a sleeve rigidly secured to its base end and extended generally lengthwise of the blade, said sleeve being in cooperating threaded relation with said other connecting part, whereby relative rotation of said threaded parts provides blade pitch change, and wherein a web is provided interconnecting the fork prongs along prong margins substantially parallel to the major axis of the blade.

8. In an aircraft sustaining rotor having a hub and a blade, a blade mounting including two cooperating parts connecting the blade with the hub, wherein: one of said parts comprises a drag pivot fork the pivot axis of which is inclined upwardly and forwardly with reference to the direction of rotation of the rotor, and wherein a web is provided interconnecting the fork prongs along the lower prong margins substantially parallel to the major axis of the blade, said web further being positioned to serve as a blade droop support when the rotor is at rest.

GAGE W. TIDD.